Patented Jan. 8, 1952

UNITED STATES PATENT OFFICE 2,581,915

STABILIZED VINYL CHLORIDE RESIN FILMS

Milton Ray Radcliffe, Winchester, Va., assignor to The Firestone Tire & Rubber Company, Akron, Ohio, a corporation of Ohio No Drawing. Application October 17, 1947,
Serial No. 780,581

8 Claims. (Cl. 18—57)

This invention relates to calendered films of vinyl chloride polymer and copolymer resins, and more particularly to the stabilization thereof against deterioration by heat during the calendering operation.

Vinyl chloride polymer and copolymer resins have been found to be admirably adapted for calendering into thin flexible sheetings or films suitable for packaging, draperies, apparel, shower curtains, etc. During the calendering operation, it is necessary to subject the resins to prolonged and severe heating and, unless stabilizing agents are incorporated, the products are discolored and have inferior mechanical properties. A number of stabilizing agents, more or less effective, have been proposed for incorporation into vinyl chloride resins to inhibit such deterioration; however, none of these proposed materials have been entirely satisfactory. Particularly, the present patentee's investigations have indicated that it would be highly desirable to calender vinyl chloride resins at somewhat higher temperatures (say on the order of 315° F.–350° F.) rather than the somewhat lower temperatures (285°–300° F.) now employed for this purpose, as the higher temperatures would result in a better fusion of the film as reflected in improved clarity, tear strength, tensile strength and flexibility. None of the stabilizers heretofore proposed have been sufficiently reliable in the higher range of temperature to be practical, and accordingly commercial films calendered from compositions containing conventional stabilizers fall short of ideal properties of transparency, mechanical strength and flexibility. In addition to aiming at stabilization at the more ideal higher range of temperatures, a stabilizer must also fulfill a number of essential and rather exacting requirements; the stabilizer must be effective over considerable periods of time, for instance as long as 30 minutes; and the stabilizer should not adversely affect the color or odor of the films produced. Furthermore it has recently been discovered that vinyl films, when compounded with higher fatty ethers and higher fatty formals, exhibit an extraordinarily high resistance to the passage of moisture—in such cases, therefore, any stabilizer employed must not adversely affect the moisture transmission resistance of the film.

Film-forming vinyl chloride resin compositions, aside from their sensitivity to heat during the calendering operation, likewise tend to become brittle and to discolor upon aging, particularly when exposed to light. It is therefore highly desirable to provide stabilizing agents which are effective against age deterioration as well as against heat deterioration of vinyl chloride resin films.

Accordingly it is an object of this invention to provide novel heat and age stabilizers for vinyl chloride polymer and copolymer resin films.

Another object is to provide heat stabilizers for such films which will be effective at higher temperatures, and for longer periods of time, than any other substances heretofore proposed for this purpose.

A further object is to provide such heat stabilizers which will be effective in stabilizing vinyl chloride resins on the calender at temperatures in the range 315°–350° F. for extended periods of time such as 30–60 minutes.

A further object is to provide stabilizers for vinyl chloride resin films which will not adversely affect the color, clarity, transparence, odor or resistance to water vapor transmission of the films.

A still further object is to provide stabilizers which will protect such films against aging as well as against heat deterioration during the calendering operation.

SYNOPSIS OF THE INVENTION

The above and other objects are secured, in accordance with this invention, by the incorporation, into a vinyl chloride polymer or copolymer resin formulation to be calendered into a film, of from .25% to 5.0% of a cadmium dialkyl mercaptide, each one of the alkyl groups of which contains from 5 to 22 carbon atoms.

THE CADMIUM ALKYL MERCAPTIDES

Referring first to the cadmium dialkyl mercaptides employed as stabilizers in this invention, these include, for instance, the cadmium mercaptides containing n-amyl, sec-amyl, n-hexyl, 2-ethylhexyl, n-octyl, n-nonyl, n-decyl, n-dodecyl, n-tetradecyl, n-hexadecyl, n-octadecyl, n-eicosyl and the like alkyl radicals containing from 5 to 22 carbon atoms. It is understood that both valences of the cadmium are attached through sulfur to alkyl radicals selected from the class of alkyl radicals set forth above, and that both of the alkyl radicals so attached to a given cadmium atom need not be the same; for instance, one alkyl radical may be a dodecyl group, while the other is an octadecyl group. Likewise instead of an unmixed single cadmium mercaptide, there may be employed a mixture of mercaptides of the types above indicated as being suitable. For instance there may be employed cadmium mercaptides of the mixed alkyl radicals derived from cocoanut oil fatty acids, or cadmium mercaptides derived from the alkyl radicals of petroleum fractions such as kerosene.

The amount of cadmium mercaptide to be incorporated into a vinyl chloride polymer or a copolymer resin composition will vary somewhat in accordance with the severity and duration of the heat conditions or other exposure to which it is anticipated that the composition will be subjected. In general, about 0.25% of mercaptide, based on the weight of vinyl chloride resin in the composition to be stabilized, will exert a definite protective action against heat deterioration; 1.0% on the same basis will generally suffice to protect the usual vinyl chloride resin composition against any heat conditions likely to be encountered in practise; greater quantities, as high for instance as 5%, may be added but will generally prove unnecessary and uneconomic. The suggested quantities of stabilizing agents will also serve to protect the compositions against aging.

THE VINYL CHLORIDE BASED RESIN

Referring next to the vinyl chloride based resins employed in the practise of this invention, these may be any resinous polymers of vinyl chloride, or resinous copolymers thereof with minor proportions of other unsaturated compounds copolymerizable therewith. With respect to the resinous copolymers, these constitute a well-known class of materials, the essential feature of which is that the molecules thereof partake essentially of the normal polymeric chain structure of simple vinyl chloride polymers with the exception that the chains are interspersed at intervals with the vestiges of other extraneous unsaturated compounds which have been drawn into the polymerization. Providing (1) that the extraneous unsaturated compounds have not entered the copolymer to the extent of more than about 20%, based on the weight of copolymer and (2) that the extraneous compounds are not of the cross-linking type, i. e., do not contain plural, independently reactive unsaturated groups capable of entering different polymeric chains, the essential character of the vinyl chloride resin is not changed by the incorporation of these extraneous unsaturated compounds, beyond a certain advantageous plasticization and increased solubility and compatibility imparted by the discontinuity of the copolymeric chain. Vinyl chloride will also tolerate, in its copolymers, up to about 2% of cross-linking comonomers without departure from the essential properties of a simple vinyl chloride polymer. Suitable non-cross-linking comonomers capable of copolymerizing with vinyl chloride are a well-known class of compounds and include for instance, vinyl esters on the order of vinyl bromide, vinyl fluoride, vinyl acetate, vinyl chloroacetate, vinyl butyrate, other higher fatty acid vinyl esters, vinyl alkyl sulfonates and the like; vinyl ethers such as vinyl ethyl ether, vinyl isopropyl ether, vinyl chloroethyl ether and the like; cyclic unsaturated compounds, such as styrene, the mono- and polychlorostyrenes, coumarone, indene, vinyl naphthalenes, vinyl pyridines, vinyl pyrrole and the like; acrylic acid and its derivatives such as ethyl acrylate, methyl methacrylate, ethyl methacrylate, ethyl chloroacrylate, acrylonitrile, methacrylonitrile, diethyl maleate, diethyl fumarate and the like; vinylidene compounds on the order of vinylidene chloride, vinylidene bromide, vinylidene fluorochloride, and the like; unsaturated hydrocarbons such as ethylene, propylene, isobutene and the like; allylic compounds such as allyl acetate, allyl chloride, allyl ethyl ether and the like; and conjugated and cross-conjugated unsaturated compounds such as butadiene, isoprene, chloroprene, 2,3-dimethyl butadiene-1,3, piperylene, divinyl ketone, and the like. Examples of cross-linking comonomers which may be included to the extent of 2% are diallyl phthalate, diallyl ether, divinyl ether, diallyl maleate and the like. For a fairly complete list of materials known to copolymerize with vinyl chloride, reference may be had to Krczil "Kurzes Handbuch Der Polymerisations-Technik II Mehrstoff-Polymerisation" Edwards Brothers, Inc. 1945, pp. 735–737, the items under "Vinylchlorid." Instead of the single unsaturated comonomers of the types above indicated, mixtures of such comonomers may enter into the copolymers, it being understood that the total quantity thereof shall be small enough (say not over 20%, based upon weight of the copolymer) that the essential character of the polyvinyl chloride chain is retained, and also provided that not over about 2% (based on the weight of copolymers) of cross-linking comonomers shall enter thereinto, in order not to impair the solubility and workability thereof.

PROPERTIES OF THE STABILIZERS OF THIS INVENTION

A feature which sharply distinguishes the mercaptide stabilizers of the present invention from any similar stabilizers heretofore proposed, is the fact that the mercaptide stabilizers both exert a highly effective stabilizing effect upon vinyl resins and also are readily compatible with such resins. Heretofore, a number of inorganic salts have been proposed as stabilizers for vinyl resins; many of these salts are highly effective, but none of them are readily compatible with vinyl resins. Likewise, numerous organic compounds have been proposed for this purpose. The organic compounds are in many cases readily compatible with the resins, but in no case exert a stabilizing effect comparable to that obtained by the use of the mercaptides of this invention.

Vinyl chloride type resins stabilized in accordance with this invention are capable of withstanding prolonged exposure to high temperatures; for instance compositions have been made which are capable of withstanding temperatures as high as 340° F. for periods as long as one hour. The present patentee's investigations have indicated that, if films of vinyl chloride based resins are calendered at high temperatures, say on the order of 315° F. to 350° F., instead of the lower temperatures of 285° to 300° F. conventionally employed, a much better fusion of the films is secured, with resultant great improvement in the transparency, clarity and tear strength of the films produced. Prior art heat stabilizers are impractical at these higher temperatures. Accordingly, this invention makes possible the manufacture of films having greatly improved transparency, clarity and tear strength as compared to conventional films. By the term "films" will be understood the thin, flexible sheetings calendered from vinyl chloride based resin compositions to a thickness of .001 inch to .008 inch.

With the foregoing discussion in mind there is given herewith a detailed example of the practise of this invention. All parts given are by weight.

Example

|  | Parts |
|---|---|
| Vinyl chloride type resin (various resins made by different manufacturers) | 76 or 81 |
| Cadmium mercaptide (containing various alkyl radicals) | 0.25, 0.5 or 1.0 |
| Dicetyl ether | 2.5 |
| Dioctyl phthalate | q. s. |
|  | 100.00 |

A series of compositions was made up in accordance with the foregoing schedule, using the vinyl chloride resins and the cadmium mercaptides of various alkyl radicals in the several proportions 0.25, 0.5 and 1.0 as listed. The compositions made are set forth herebelow in Table I together with results of endurance and aging tests conducted thereon, and the properties of films calendered therefrom at the high temperatures made possible by the practise of this invention.

CALENDER ENDURANCE TESTS

Each composition was tested for heat stability by working the composition on a calender maintained at 320° F. until the composition began to decompose, as evidenced by a tendency to adhere strongly to the rolls. The proportions of ingredients in the several compositions, together with the length of time which the respective compositions endured the calender test, are set forth in Table I hereinbelow.

FILM TESTS

In addition to the calender endurance test above described, the compositions were worked for 15 minutes on a calender at 320° F., to simulate rather severe manufacturing conditions, and then calendered on the same calender at 320° F. into films .002" thick. Properties of the films were determined as follows:

The moisture transmission coefficient of each film was determined in accordance with the General Foods Moisture Transmission Test.

The color of each film was rated by the operator.

The transparency of each film was determined by superposing layers of the film over a .01" india ink line drawn on hot-press Bristol board; the total thickness of film, in mils, required to render the line indistinguishable, was taken as a measure of the transparency of the film.

The tensile strength and elongation at break of each film was likewise determined on a Scott Tester.

The properties of each film are set forth in Table I opposite the composition thereof. From inspection it will be seen that the stabilizers of this invention all retained intact the tensile properties of the film.

By way of contrast, compositions identical with the above formulations but omitting the stabilizer stuck to the calender rolls and charred within 5 minutes when the calender was operated at 320° F.

The films stabilized in accordance with this invention also had excellent resistance to deterioration by weathering. For instance, film containing 1% of the various cadmium mercaptides withstood outdoor exposure in the vicinity of New York City for over 14 weeks, at the end of which time they still retained their strength, flexibility and extensibility.

From the foregoing general discussion and detailed specific examples, it will be seen that the practise of this invention effectively stabilizes vinyl chloride type resins against deterioration by heat during the fabrication thereof, and also protects the resins against aging. The stabilizers of this invention enable the resins to be calendered at much higher temperatures than have heretofore been practical, with the resultant improved fusion, transparency, clarity and tensile and tear strengths of the films produced. The stabilizers of this invention do not interfere with the desired properties, such as moisture transmission resistance, transparency, etc. of the resin films. The stabilizers are, moreover, cheaply and reliably procurable.

What is claimed is:

1. A highly transparent, clear film having high tensile and tear strengths, comprising a resin selected from the group consisting of polymers of vinyl chloride and copolymers thereof with up to 20%, based on the weight of copolymers, of other unsaturated compounds copolymerizable therewith, said film containing as a stabilizer from 0.25% to 5.0% of a cadmium alkyl mercaptide in which the alkyl groups contain from 5 to 20 carbon atoms.

2. A highly transparent, clear film having high tensile and tear strengths, comprising a resin selected from the group consisting of polymers of vinyl chloride and copolymers thereof with up to 20%, based on the weight of copolymers, of other unsaturated compounds copolymerizable therewith, said film containing as a stabilizer from 0.25% to 5.0% of cadmium lauryl mercaptide.

3. A highly transparent, clear film having high tensile and tear strengths, comprising a copolymer of vinyl chloride with from 5% to 15% of vinylidene chloride, said film containing as a stabilizer from 0.25% to 5.0% of cadmium lauryl mercaptide.

*Table I*

| Resin Used | | Mercaptide Stabilizer | | Endurance at 320° F., Min. | Properties of Film made after 15 Minutes on Calender at 320° F. | | | | |
| --- | --- | --- | --- | --- | --- | --- | --- | --- | --- |
| Type | Percent in Mix | Alkyl Radical | Percent in Mix | | Moisture Transmission | Color | Clarity Mils. | Tensile Strength #/in² (E) | Elongation Percent |
| (A) | 81 | amyl | .5 | 40 | 3.0 | good | 70 | 4,500 | 260 |
| | | | 1.00 | 100 | 3.5 | excellent | 72 | 4,000 | 250 |
| | | octyl | .5 | 60 | 4.0 | do | 81 | 4,200 | 280 |
| | | | 1.00 | 100 | 3.0 | do | 70 | 4,000 | 300 |
| | | cocoanut (D) | .25 | 50 | 3.0 | good | 75 | 4,600 | 250 |
| | | | .50 | 100 | 4.0 | excellent | 78 | 4,000 | 210 |
| | | | 1.00 | 100 | 3.4 | do | 75 | 4,200 | 250 |
| (B) | 76 | do | 1.00 | 100 | 3.8 | do | 75 | 4,300 | 250 |
| (C) | 81 | do | 1.00 | 100 | 3.0 | do | 78 | 4,200 | 270 |
| (A) | 81 | palmityl | 1.00 | 100 | 3.0 | do | 75 | 4,100 | 250 |
| | | stearyl | 1.00 | 100 | 3.0 | do | 75 | 4,500 | 260 |

Notes:
(A) A copolymer of 90% vinyl chloride, 10% vinylidene chloride by weight.
(B) A copolymer of 87% vinyl chloride, 13% vinyl acetate by weight.
(C) A copolymer of 80% vinyl chloride, 20% diethyl maleate by weight.
(D) A cadmium mercaptide of the alkyl radicals contained in which the fatty alchols produced by hydrogenation of cocoanut oil fatty acids. Consist chiefly of lauryl and myristyl radicals.
(E) The notation "(#/in²)" denotes "pounds per square inch."

4. A highly transparent, clear film having high tensile and tear strengths, comprising a copolymer of vinyl chloride with from 5% to 15% of vinyl acetate, said film containing as a stabilizer from 0.25% to 5.0% of cadmium lauryl mercaptide.

5. Process which comprises calendering, at temperatures from 315° F. to 350° F., a composition comprising a resin selected from the group consisting of polymers of vinyl chloride and copolymers thereof with up to 20%, based on the weight of copolymers, of other unsaturated compounds copolymerizable therewith, said film containing as a stabilizer from 0.25% to 5.0% of a cadmium alkyl mercaptide in which the alkyl groups contain from 5 to 20 carbon atoms.

6. Process which comprises calendering, at temperatures from 315° F. to 350° F., into the form of a thin, flexible, highly transparent film, a composition comprising a resin selected from the group consisting of polymers of vinyl chloride and copolymers thereof with up to 20%, based on the weight of copolymers, of other unsaturated compounds copolymerizable therewith, said film containing as a stabilizer from 0.25% to 5.0% of cadmium lauryl mercaptide.

7. Process which comprises calendering, at temperatures from 315° F. to 350° F., into the form of a thin, flexible, highly transparent film, a composition comprising a copolymer of vinyl chloride with from 5% to 15% of vinylidene chloride, said film containing as a stabilizer from 0.25% to 5.0% of cadmium lauryl mercaptide.

8. Process which comprises calendering, at temperatures from 315° F. to 350° F., into the form of a thin, flexible, highly transparent film, a composition comprising a copolymer of vinyl chloride with from 5% to 15% of vinyl acetate, said film containing as a stabilizer from 0.25% to 5.0% of cadmium lauryl mercaptide.

MILTON RAY RADCLIFFE.

REFERENCES CITED

The following references are of record in the file of this patent:

UNITED STATES PATENTS

| Number | Name | Date |
| --- | --- | --- |
| 2,067,025 | Schmidt | Jan. 5, 1937 |
| 2,075,543 | Reed | Mar. 30, 1937 |
| 2,140,518 | Doolittle | Dec. 20, 1938 |
| 2,310,449 | Lightbown et al. | Feb. 9, 1943 |

FOREIGN PATENTS

| Number | Country | Date |
| --- | --- | --- |
| 498,742 | Great Britain | Jan. 9, 1939 |

OTHER REFERENCES

Karrer, Organic Chemistry, 3rd ed., Elsevier Publishing Co., New York. 1947.